(12) United States Patent
Adra (10) Patent No.: US 12,536,498 B2
(45) Date of Patent: Jan. 27, 2026

(54) DYNAMIC PUT-AWAY

(71) Applicant: CreateASoft, Inc., Aurora, IL (US)

(72) Inventor: Hosni I. Adra, Naperville, IL (US)

(73) Assignee: CREATEASOFT, INC., Aurora, IL (US)

( * ) Notice: Subject to any disclaimer, the term of this patent is extended or adjusted under 35 U.S.C. 154(b) by 173 days.

(21) Appl. No.: 18/482,712

(22) Filed: Oct. 6, 2023

(65) Prior Publication Data

US 2025/0117743 A1   Apr. 10, 2025

(51) Int. Cl.
*G06Q 10/087* (2023.01)
*G06F 30/20* (2020.01)
*G06Q 10/067* (2023.01)

(52) U.S. Cl.
CPC ......... *G06Q 10/087* (2013.01); *G06Q 10/067* (2013.01); *G06F 30/20* (2020.01)

(58) Field of Classification Search
CPC ..... G06Q 10/087; G06Q 10/067; G06F 30/20
See application file for complete search history.

(56) References Cited

U.S. PATENT DOCUMENTS

| | | | | |
|---|---|---|---|---|
| 7,881,820 B2* | 2/2011 | Antony | ............... | G06Q 10/087 700/214 |
| 10,504,061 B1* | 12/2019 | Shi | ................ | G06Q 10/0838 |
| 10,796,278 B1* | 10/2020 | Wintz | ................ | G06Q 10/0833 |
| 10,926,952 B1* | 2/2021 | Shi | ................ | G06N 3/08 |
| 11,436,560 B2* | 9/2022 | Wintz | ................ | G06Q 10/0833 |
| 11,507,922 B1* | 11/2022 | Medidhi | ................ | G06N 20/00 |
| 12,172,846 B2* | 12/2024 | Wintz | ................ | B65G 43/08 |
| 2009/0216364 A1* | 8/2009 | Grissom | ............ | G06Q 10/087 700/214 |
| 2011/0295413 A1* | 12/2011 | Hara | ............ | G06Q 10/087 700/216 |
| 2012/0054076 A1* | 3/2012 | Wu | ............ | G06Q 10/087 705/28 |
| 2018/0218471 A1* | 8/2018 | Stengel | ............ | G06T 7/60 |
| 2018/0300435 A1* | 10/2018 | Eckman | ............ | G06Q 10/08 |
| 2019/0287053 A1* | 9/2019 | Tomoda | ............ | G06Q 10/1091 |
| 2020/0034780 A1* | 1/2020 | Sikka | ............ | G06Q 30/0202 |
| 2021/0150428 A1* | 5/2021 | Walet | ............ | G06Q 10/06313 |

(Continued)

OTHER PUBLICATIONS

Chen, Shazhou, et al. "A warehouse management system with uav based on digital twin and 5g technologies." 2020 7th International Conference on information, cybernetics, and computational social systems (ICCSS). IEEE, 2020. (Year: 2020).*

(Continued)

*Primary Examiner* — Nathan A Mitchell
(74) *Attorney, Agent, or Firm* — Seed Intellectual Property Law Group LLP (57) ABSTRACT

A facility for determining storage locations for items in a complex during put-away operations is described. The facility receives an indication of one or more orders that indicate a time at which at least one item is scheduled to arrive at the complex. The facility obtains simulation data that includes one or more predicted states of the complex by applying the indicated orders to a digital twin simulation of a complex. The facility identifies attributes of an item indicated in at least one of the orders and identifies one or more storage locations for the item based on the simulation data and the attributes.

20 Claims, 8 Drawing Sheets

(56) References Cited

U.S. PATENT DOCUMENTS

2025/0061396 A1* 2/2025 Sikander ................ G06Q 10/04
2025/0148417 A1* 5/2025 Schüthe ................. G06V 20/52

OTHER PUBLICATIONS

Korth, Benjamin, Christian Schwede, and Markus Zajac. "Simulation-ready digital twin for realtime management of logistics systems." 2018 IEEE international conference on big data (big data). IEEE, 2018. (Year: 2018).*

Leng, Jiewu, et al. "Digital twin-driven joint optimisation of packing and storage assignment in large-scale automated high-rise warehouse product-service system." International Journal of Computer Integrated Manufacturing 34.7-8 (2021): 783-800. (Year: 2021).*

* cited by examiner

FIG. 3 order data table 400

| Item ID | Item Description | Nesting factor | Item Attributes | Item Storage Constraints | Arrival Time |
|---|---|---|---|---|---|
| 1111 | Plastic Cup | Orientation: Upright; Nesting Coefficient: 0.5; Maximum column: 10 | Height: 10"<br>Radius: 3"<br>Weight: 2oz | • Can handle 10 items at once<br>• Can be moved outside of picking and put-away operations | July 10, 10am |
| 2222 | Wooden Box | Orientation: any; Nesting Coefficient: 1; Maximum column: 1 | Height: 2'<br>Length: 1'<br>Width: 2'<br>Weight: 30lbs | • Can be moved outside of picking and put-away operations<br>• Forklift required to move<br>• Can handle 3 items at once | July 10, 10am |
| 3333 | Pallet of soda | Orientation: upright; Nesting Coefficient: 1; Maximum column: 5 | Height: 3'<br>Length: 3'<br>Width: 3'<br>Weight: 100lbs | • Stored in refrigerated area<br>• Cannot be moved except for picking and put-away operations<br>• AGV required to move<br>• Storage media weight limit: 600lbs | July 11, 9am |
| ... | ... | ... | ... | ... | ... |

401 spans Item Description, Nesting factor
402 spans Item Attributes
403 spans Item Storage Constraints, Arrival Time 420, 421, 422, 423, 424, 425

DYNAMIC PUT-AWAY

BACKGROUND

Complexes in which items are stored and retrieved—such as factories, fulfillment centers, warehouses, etc.—typically have designated storage areas for items, and items arriving at the complex are stored ("put-away") until they are retrieved for transportation outside of the complex ("picking"). Entities that perform put-away and picking operations in a complex include: people, such as workers in the complex, customers, visitors, etc.; vehicles, such as automated vehicles, for example, an Automated Guided Vehicle (an AGV), vehicles operated by a person, etc.; and other entities that may handle an item in a complex.

DETAILED DESCRIPTION

The inventor has recognized that it would be of great benefit to simulation engineers, managers of simulated complexes, etc., to use a simulation of the complex to dynamically adjust the put-away process for items stored in a complex. The simulation is used to identify a storage location for the items as they are received based on the current state of the complex and attributes of the items. The inventor has also determined that it would be beneficial to use the simulation to predict how entities will move within the complex as they put away items or pick them.

The inventor has recognized a variety of disadvantages of current simulation and warehouse management software and practices for performing put-away operations. Typical simulation and warehouse management software assigns a storage location to an item at the closest place in which the item can fit in an attempt to reduce the amount of time that the item travels to storage locations from the receiving area of the complex. Furthermore, these systems do not accurately account for nesting items correctly, which reduce the maximum storage density of the complex. Additionally, conventional software fails to account for congestion caused by entities moving throughout the complex increases the amount of time spent by entities during put-away and picking processes.

As a result of these disadvantages, the storage locations in the complex are inefficiently used, such that the maximum storage density of the complex cannot be reached. Furthermore, typical simulation and warehouse management systems require excess handling of items so that they be moved in order to create space for incoming items, resulting in excess resources needing to be used to move the items to create the space. Additionally, typical simulation and warehouse management systems do not properly account for items that are able to nest within, on top of, etc., each other.

In response to recognizing these disadvantages, the inventors have conceived and reduced to practice a software and/or hardware facility for dynamically controlling put-away and picking processes ("the facility"). By using a digital twin simulation model of the complex, the facility is able to determine storage areas for incoming items in real-time, in a way that more fully account for the full cost of put-away operations and later corresponding picking operations. The facility additionally causes these items to be placed in the determined storage areas by causing an entity to move the items to the designated storage area.

The facility operates a digital twin simulation model of a complex to determine a storage location for an item. In some embodiments, operating the digital twin simulation model includes obtaining one or more incoming orders, one or more outgoing orders, or some combination thereof. An incoming order includes one or more of: an indication of one or more items presently arriving at the complex or an indication of a future time at which one or more items will arrive at the complex. An outgoing order includes one or more of: an indication of one or more items presently departing from the complex or an indication of a future time at which one or more items will depart from the complex. In some embodiments, the facility determines the storage location of the item based on one or more factors, such as: a size or dimension of the item; a volume of the item; a nesting factor of the item; a weight of the item; a crushability factor of the item; a seasonality of the item; an indication of the quantity of the item in the complex; an indication of handling constraints for the item, such as an indication of whether the item can be moved multiple times, whether special equipment is needed for the item, an indication of whether the item needs to be stored in a certain type of storage area, or other handling constraints; an indication of whether multiple items of the same type are included in the order; an indication of whether multiple items of the same type can be handled together; an indication of the current state of the digital twin simulation model; an indication of one or more congestion factors; an indication of the number of entities available to handle the item; an indication of the efficiency of at least one of the entities; an indication of the constraints of the storage media of the item, such as a weight limit for the storage media, a volume limit of the storage media, a direction that the storage media should face, or other constraints of storage media; an indication of an orientation requirement of the item when stored; an indication of the cost factors of at least one handling constraint, such as a cost of using an entity to handle the item; an indication of the cost factors of at least one storage constraint, such as a cost to store the item for a selected period of time; a controlled item requirement, such as an indication that the item is to be stored in a controlled area, such as a temperature-controlled area, a humidity-controlled area, a security-controlled area, etc.; a predicted need for the item at a future time; information about existing outgoing orders for the item; predicted future outgoing orders for the item; or other factors used to determine a storage area for an item.

In some embodiments, the facility determines a nesting factor of the item as part of determining a storage location for the item. The nesting factor includes an indication of the orientation of the item when stored, such as an indication of the orientation of the item in the x, y, and z planes. In some embodiments, the nesting factor includes a nesting coefficient that indicates how nested items affect the total storage space. For example, the nesting coefficient of a cup may indicate that when two cups are nested together the total height of the cup is less than the sum of the height of each of the two cups added together. In some embodiments, the facility identifies one or more nesting constraints of the item, such as whether the item rolls, a maximum or minimum number of rows or columns for storing the item, or other factors that indicate how the item will interact with other items when stored near or on top of the other items. In some embodiments, the facility generates a visual indication of how the item should be stored based on the nesting factor and the current state of the digital twin simulation model. In some embodiments, the facility generates the visual indication based on the dimensions of the storage location, the dimensions of the items currently stored in the location, the dimensions of the item, and the nesting factor to determine whether the item can be stored in the storage location.

A factor of the congestion, or "traffic," around storage areas is determined based on one or more orders received by the facility. The facility determines the factor of congestion by applying the one or more orders to the digital twin simulation model to identify where and when entities will be picking items, putting away items, or performing other operations within the complex. In some embodiments, the facility generates one or more heat maps, traffic maps, congestion maps, etc., that indicate the amount of traffic throughout the complex based on the application of the one or more orders to the digital twin simulation model. In some embodiments, the facility collects data regarding the change in the congestion factor throughout the complex over time. In such embodiments, the facility may use the data regarding the change in the congestion factor over time and an indication of future orders to predict times at which one or more locations throughout the complex will be heavily congested.

In some embodiments, the facility trains an artificial intelligence or machine learning model (a "machine learning model") to determine a storage location for an item. The facility trains the machine learning model based on historical data of where items are stored and the "cost of SKU" for storing each item. In some embodiments, the historical data additionally includes a number of orders per hour fulfilled by the complex, a lead time for orders at the complex, or some combination thereof. A cost of SKU is a cost calculated based on one or more of: one or more storage requirements for the item; the number of interactions with the item by one or more entities needed to store or stage the item; an indication of the amount of time needed to adjust a pallet or other storage container containing the item; an indication of whether the item can be stored on a rack, on the floor, or on another storage implement; a cost associated with one or more entities that interact with the item; a cost to store the item for a selected period of time; or other costs associated with storing the item. In some embodiments, the facility re-trains the machine learning periodically in order to enhance the accuracy of the machine learning model, to ensure the machine learning model takes into account seasonality of the items, or some combination thereof. In some embodiments, the machine learning model outputs a cost of SKU for storing the item at a location. In some embodiments, the facility applies one or more of: a description of the item, a location for storing the item; a number of picks at the location; an elevation of the location; a depth of the location; a factor of the amount of time needed to pick the item; a time of day at which the item is to be stored; an indication of the number of similar items that can be picked at the same time; or other factors related to storing the item to the machine learning model as inputs.

The facility pre-selects one or more locations for an item based on one or more orders for items that will be stored at, or will be taken from, the complex. In some embodiments, the facility identifies the pre-selected locations based on a cost of SKU for storing the items at one or more locations. In some embodiments, the facility determines whether to adjust the pre-selected location in real-time when the item arrives at the complex. In such embodiments, the facility may determine whether to adjust the pre-selected location based on the current state of the digital twin simulation model and a cost of SKU of one or more alternate storage locations. In some embodiments, the cost of SKU of the alternate storage locations is calculated based on the current state of the digital twin simulation model.

In an example embodiment, the facility receives an incoming order that indicates that an item will arrive at the complex at a future time. The facility uses a digital twin simulation model to obtain a forecasted state of the complex at the future time, including a factor of the congestion around storage areas at the future time. The facility identifies attributes of the item, including a nesting factor of the item, and uses the attributes and the forecasted state of the complex to identify one or more locations for storing the item at the future time. The facility determines a cost of SKU for each of the determined locations and pre-selects one or more locations for which the cost of SKU is determined. When the item arrives at the complex, the facility determines a congestion factor around the pre-selected locations based on the current state of the complex and determines whether a storage location selected for the item should be adjusted based on the congestion factor around the pre-selected locations and the current state of the complex.

By performing in some or all of the ways described above, the facility is able to quickly and reliably determine a storage location for an item as it is received, as well as to select items to fulfill outgoing orders. Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, the facility is able to reduce handling of each item in the complex by entities by choosing the optimal storage area for items when they are received at a complex. In this example, computing systems that manage or are used by entities expend fewer computing resources, such as memory and processing power, instructing or controlling entities to handle items because the number of times items are handled is reduced. Examples of the reduction in computing and other resources include: reducing the number of times an AGV or other robots must move items to make space for incoming items, reducing the number of times a computing system is needed to instruct workers in the complex to move items, and reducing the need for special equipment needed to move items into or out of certain locations.

Furthermore, the processes, data, and models used by the facility are an improvement in the technical field of simulation and warehouse management software. The processes, data, and models are able to maximize the storage density used by complexes simulated by the facility in a way that is beyond the capabilities of typical simulation and management software. The processes, data, and models are also able to reduce the handling of items in a way that is also beyond the capabilities of current simulation and management software.

Figure 1:
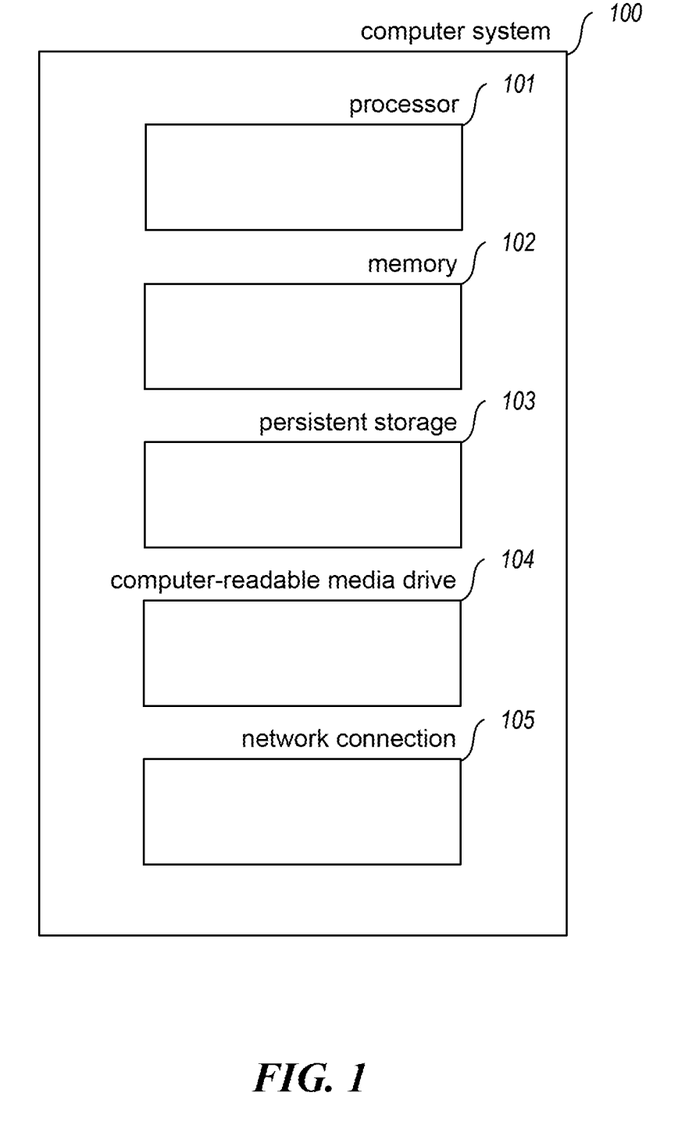
FIG. 1 is a block diagram showing some of the components typically incorporated in at least some of the computer systems and other devices on which the facility operates.

FIG. 1 is a block diagram showing some of the components typically incorporated in at least some of the computer systems and other devices on which the facility operates. In various embodiments, these computer systems and other devices 100 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 101 for executing computer programs and/or training or applying machine learning models, such as a CPU, GPU, TPU, NNP, FPGA, or ASIC; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Those skilled in the art will appreciate that the acts shown in the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Furthermore, while the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed, encrypted, and/or indexed; may contain a much larger number of rows than shown, etc.

Figure 2:
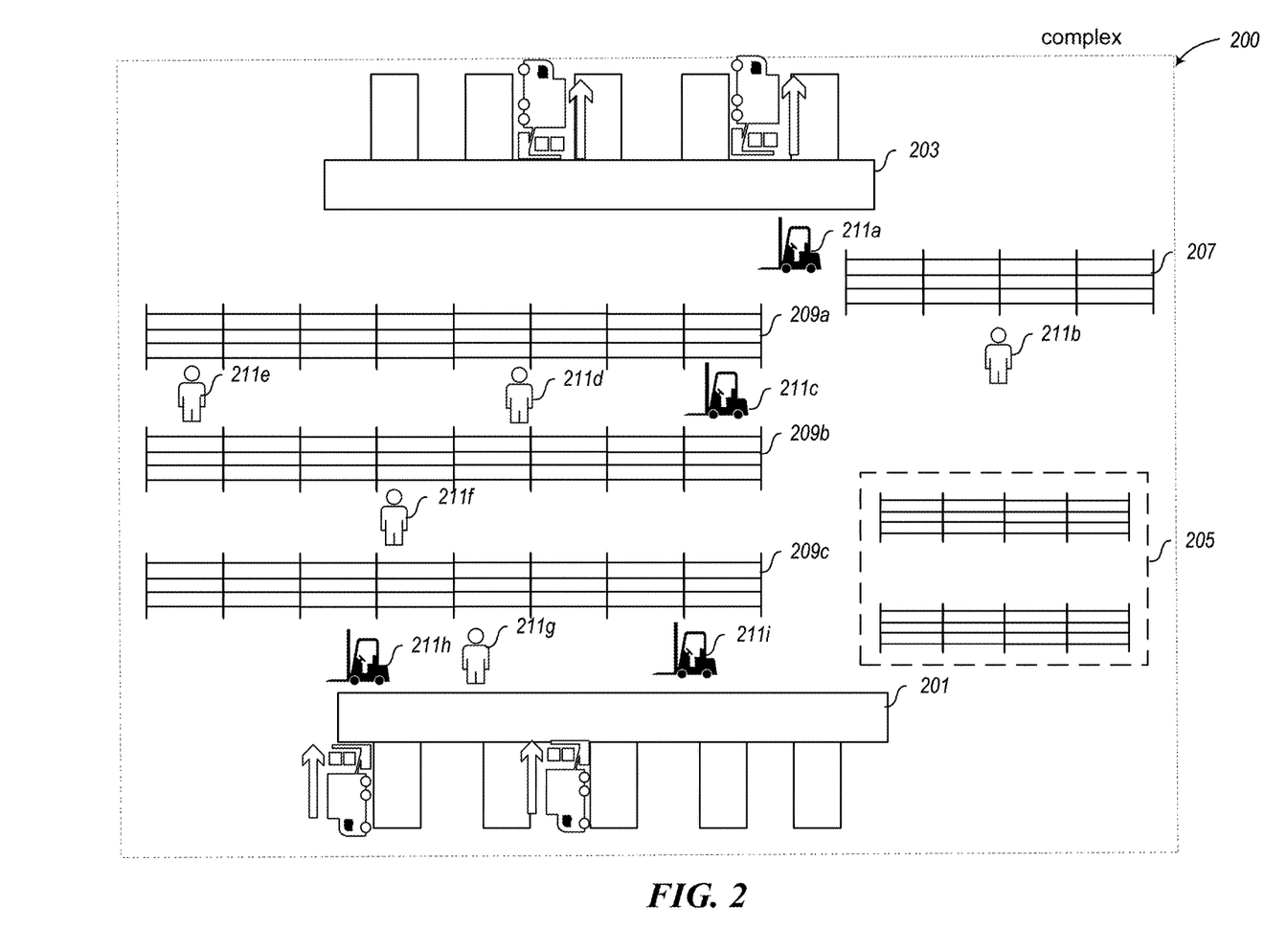
FIG. 2 is a complex diagram showing a sample state of a simulated complex which is displayed by the facility in some embodiments.

FIG. 2 is a complex diagram showing a sample state of a simulated complex 200 which is displayed by the facility in some embodiments. The sample simulated complex 200 is generated by the facility to represent a complex, such as a factory, fulfillment center, medical complex, or other complex. The simulated complex 200 is a "digital twin" of the complex that it represents, such that it is able to simulate the current state of the complex, a past state of the complex, or a predicted future state of the complex. In some embodiments, the facility generates the simulated complex 200 based on a definition of a simulation model, such as a simulation model provided via user input. In some embodiments, the definition of a simulation model includes one or more of: information describing the layout of the complex, one or more entities in the simulation model, one or more objects or items that may be received at or may depart from the complex, one or more orders for items that have been or will be received at or may depart from the complex, one or more items or objects that are currently stored in the complex, or other data that may be used to create a digital twin simulation model of a complex.

The simulated complex 200 includes: a receiving area 201; a shipping area 203; a specialized storage area 205; a picking rack 207; one or more storage racks 209a, 209b, and 209c (collectively "storage racks 209"); and one or more entities 211a, 211b, 211c, 211d, 211e, 211f, 211g, 211h, and 211i (collectively "entities 211"). The receiving area 201 is an area within which items associated with incoming orders arrive, and from which items are put away by an entity, such as one or more of the entities 211a-211i. The shipping area 203 is an area within which items associated with outgoing orders are loaded onto one or more vehicles for transportation away from the complex 200.

The specialized storage area 205 is a controlled storage area that is able to provide a controlled environment for storing one or more items within the complex. For example, the specialized storage area 205 may be a temperature-controlled area, a humidity-controlled area, a security-controlled area, etc. The picking rack 207 is a storage rack that stores items that have been picked to be shipped out through the shipping area 203. For example, an outgoing order may include one or more items that are picked by one or more entities and stored on the picking rack 207 until a vehicle that is able to transport the items arrives and is loaded. The storage racks 209 are each storage racks that hold items that are put away after they arrive at the complex via the receiving area 201. Although FIG. 2 depicts racks for storage within the complex 200, embodiments are not so limited, and the complex 200 may include storage areas or containers other than storage racks, such as, for example, an automated storage and retrieval system.

The entities 211 are each entities that interact with items during put-away and picking processes, such as human workers, manually driven forklifts or other vehicles, autonomous vehicles, etc. The entities receive instructions regarding where to store items, how to store the items, an orientation for storing the items, a route to take to the storage area, which items should be picked, whether items should be moved from one storage location to another, etc., and carry out those operations when items in an order arrive at or are to depart from the complex 200. In some embodiments, the entities receive such instructions via a computing system or other hardware device accessible to the entity.

Figure 3:
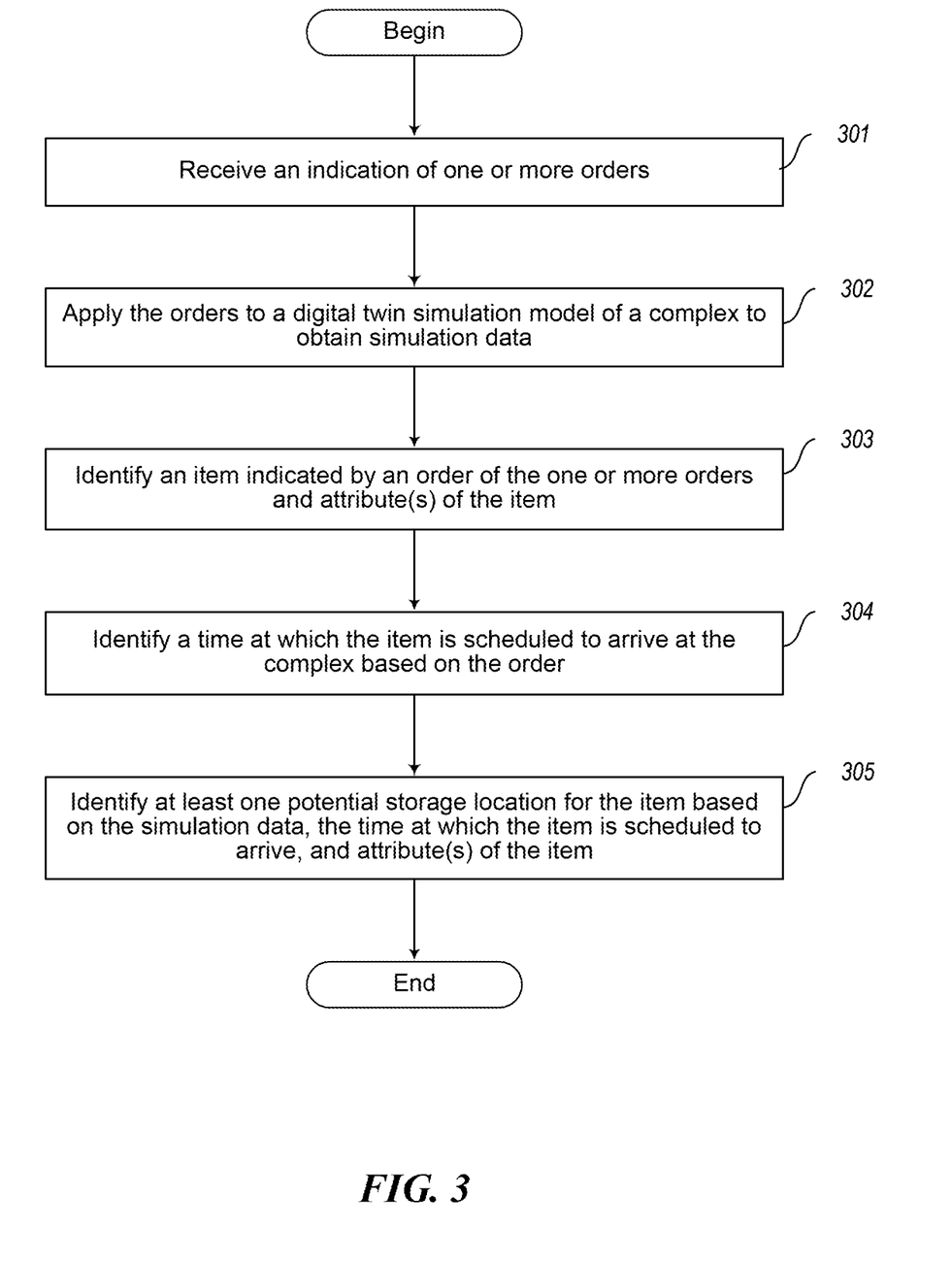
FIG. 3 is a flow diagram of a process to identify a storage location for an item used by the facility in some embodiments.

FIG. 3 is a flow diagram of a process to identify a storage location for an item used by the facility in some embodiments. First, at act 301, the facility receives an indication of one or more orders. In some embodiments, the orders include information describing one or more items, one or more attributes of the items, one or more times at which the items are scheduled to arrive at a complex, one or more times at which the items are scheduled to depart from the complex, or other information relevant to orders that describe shipments to and from a complex. In some embodiments, an order is stored in an order data table, such as the order data table 400 described below in connection with FIG. 4.

Figure 4:
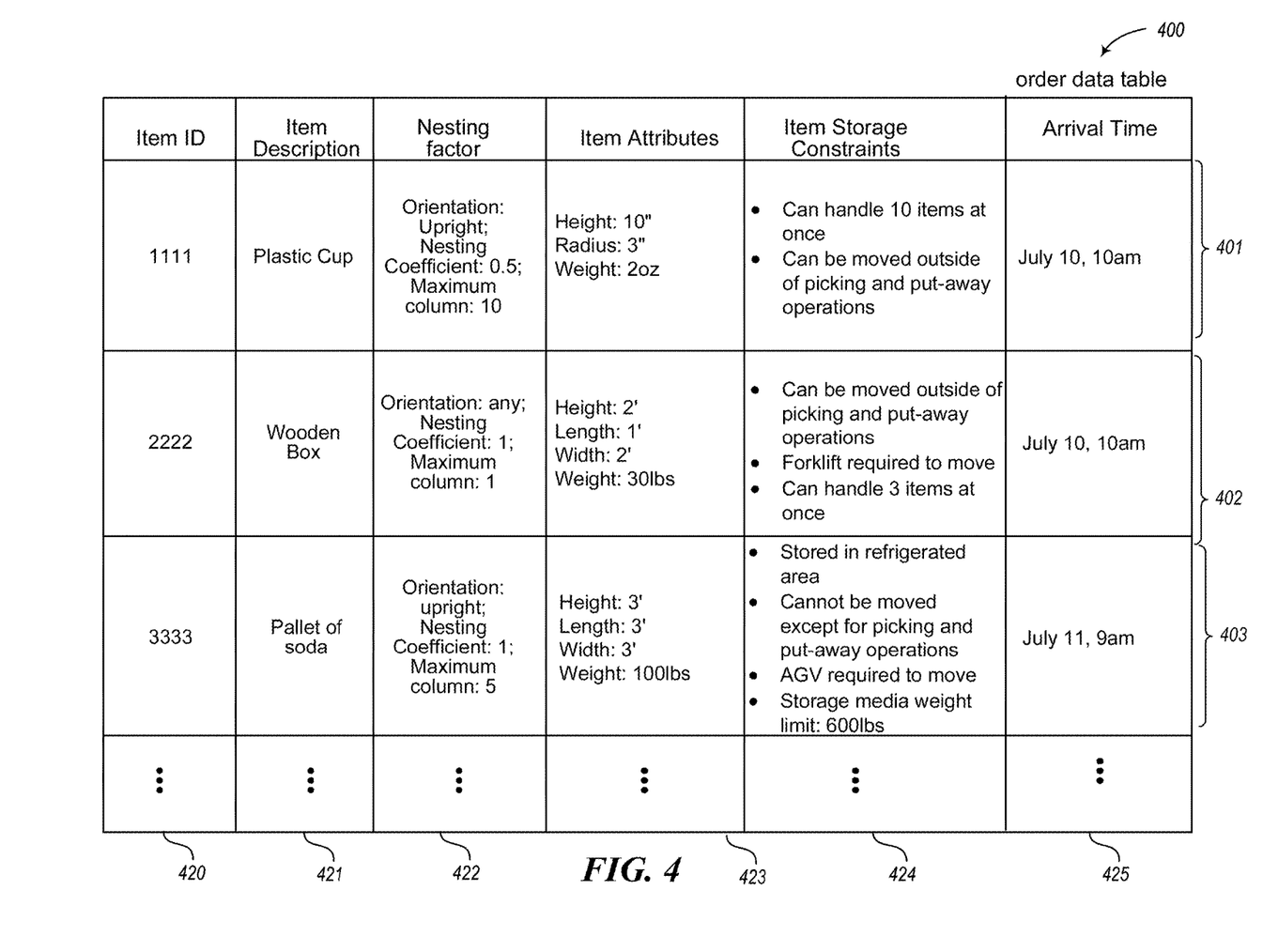
FIG. 4 is a table diagram depicting an order data table used by the facility in some embodiments.

FIG. 4 is a table diagram depicting an order data table 400 used by the facility in some embodiments. The order data table includes an item id column 420, an item description column 421, a nesting factor column 422, an item attributes column 423, an item storage constraints column 424, and an arrival time column 425. Although the order data table 400 depicts many attributes of items included in an order, embodiments are not so limited, and the order data table 400 may include any item attribute that is related to the factors used by the facility to identify a storage location for an item. The item id column 420 includes information identifying an item included in an order represented by the order data table 400. The item description column 421 includes information indicating a description of the item identified in the item id column 420.

The nesting factor column 422 includes information indicating one or more nesting constraints for the item identified in the item id column 420. For example, row 401 indicates that item "1111" should be stored upright, that ten of the same item can be stacked, and that the nesting coefficient is 0.5. In another example, row 402 indicates that item "2222" can be stored in any orientation, can be stacked up to five items high, and has a nesting coefficient of 1.

The item attributes column 423 includes information indicating one or more attributes of the item identified in the item id column 420, such as, for example, a size of the item, a weight of the item, a color of the item, or other attributes of the item. For example, row 403 indicates that item "3333" has a height, width, and length of three feet and weighs 100 pounds. As another example, row 401 indicates that item "1111" is ten inches high, has a radius of three inches, and weighs two ounces.

The item storage constraints column 424 includes information identifying storage constraints for the item identified in the item id column 420, such as a maximum number of items that an entity can handle at one time, whether the item is able to be moved to another storage location, a weight limit of the storage media of the item, whether special equipment is required to handle the item, a type of controlled area for storing the item, and other attributes related to storing the item. For example, row 401 indicates that an entity can handle up to ten of item "1111" at one time and that the item can be moved to other storage areas outside of picking and put-away operations, such as to make room for other items at a storage location. Row 403 indicates that item "3333" is to be stored in a refrigerated area, that the item cannot be moved outside of picking and put-away operations, that the item's storage medium has a weight limit of six hundred pounds, and that an AGV is required to move the item. Row 402 indicates that item "2222" can be moved outside of picking and put-away operations, that a forklift is required to move the item, and that three of the item can be handled by a single entity.

The arrival time column 425 includes information indicating a time at which the item identified in the item id column 420 is scheduled to arrive at the complex. For example, rows 401 and 402 indicate that items "2222" and "1111" are scheduled to arrive at 10:00 am on July 10, while row 403 indicates that item "3333" is scheduled to arrive at 9:00 am on July 11.

Returning to FIG. 3, at act 302, the facility applies the orders to a digital twin simulation model of a complex, such as the simulated complex 200 described above in connection with FIG. 2, to obtain simulation data. The simulation data includes one or more predicted states of the complex after the arrival of the orders. In some embodiments, the simulation data includes an indication of congestion, or "traffic," within the complex caused by put-away and picking operations that are scheduled to occur during the time at which the orders are scheduled to arrive, during the time at which the put-away and picking operations for items included in the orders are being performed, or other times related to the functioning of the complex. In some embodiments, a predicted state of the complex includes an indication of the storage capacity of one or more storage areas within the complex.

In some embodiments, the orders applied to the digital twin simulation model include outgoing orders. In some embodiments, at least a portion of the outgoing orders are identified based on user input that identifies one or more orders. In some embodiments, at least a portion of the outgoing orders are predicted orders that are generated by a machine learning model configured to predict a number of outgoing orders that may be received by the complex at a selected time.

At act 303, the facility identifies an item indicated by an order of the one or more orders and identifies attributes of the item based on the order. In some embodiments, the facility identifies attributes of the item based on data stored in one or more item data repositories that store data indicating attributes for items.

At act 304, the facility identifies a time at which the item is scheduled to arrive at the complex based on the order. In some embodiments, the facility identifies a range of times based on the scheduled arrival of the item. In such embodiments, the range of times may be a pre-selected range of times, determined based on historical data for orders of a similar type to the respective order (such as data indicating that orders fulfilled by an entity that is fulfilling the respective order are more likely to arrive on-time, early, late, etc.), status updates received from the entity fulfilling the respective order, or other data that may be used to determine a range of times within which an order will arrive at a complex.

At act 305, the facility identifies at least one potential storage location for the item based on the simulation data, the time at which the item is scheduled to arrive, and one or more attributes of the item. In some embodiments, the facility uses the simulation data to identify storage locations that have capacity to store the item. In some embodiments, to identify the at least one potential storage location, the facility generates a cost of SKU for storing the item at one or more storage locations that have capacity to store the item based on the one or more attributes of the item and the simulation data. The facility may use the cost of SKU to prioritize storage locations for the item that will have capacity to store the item, such that a lower cost of SKU for storing the item at a storage location results in a higher prioritization of the storage location and vice versa.

After act 305, the process ends.

Figure 5:
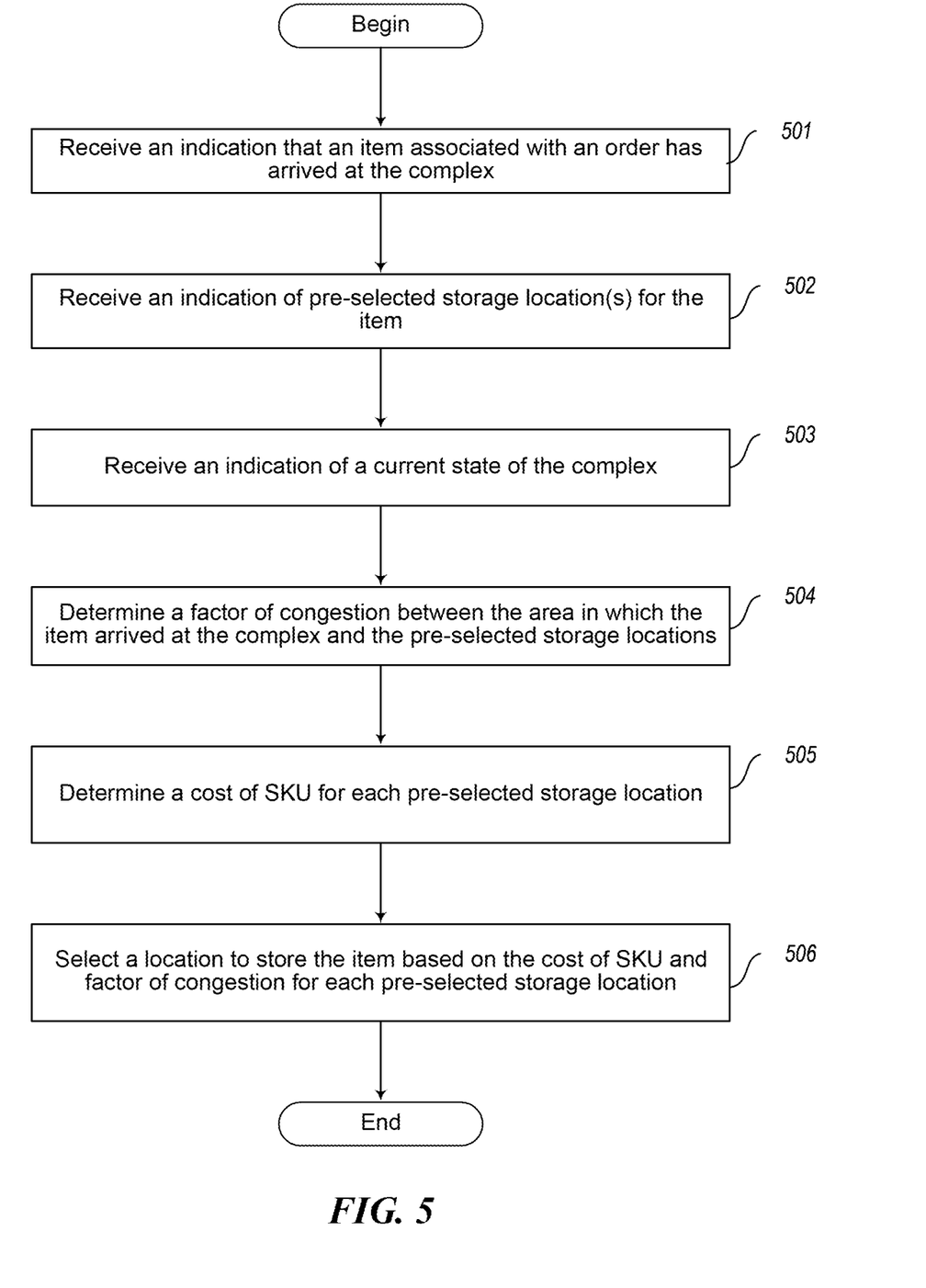
FIG. 5 is a process to select a location for storing an item when the item arrives at a complex used by the facility in some embodiments.

FIG. 5 is a process to select a location for storing an item when the item arrives at a complex used by the facility in some embodiments. First, at act 501, the facility receives an indication that an item associated with an order has arrived at the complex. In some embodiments, the facility receives the indication that the item has arrived at the complex from a digital twin simulation model of the complex. In some embodiments, the facility receives the indication that the item has arrived at the complex from one or more computing devices that have detected, or have received input indicating, the arrival of the item at the complex.

At act 502, the facility receives an indication of one or more pre-selected storage locations for the item. In some embodiments, the pre-selected storage locations are determined via a process to identify a storage location for an item, such as the process described above in connection with FIG. 3.

At act 503, the facility receives an indication of a current state of the complex. In some embodiments, the facility receives simulation data that includes an indication of the current state of the complex from a digital twin simulation model of the complex. In some embodiments, the facility receives the indication of the current state of the complex from one or more computing devices that detect the current state of an aspect of the complex, receive input regarding the current state of an aspect of the complex, or some combination thereof. A current state of the complex includes one or more of: information regarding storage areas included in the complex, such as a location, capacity, or other attribute regarding a storage area; information regarding one or more entities present in the complex, such as a location, type of entity, current or upcoming task, or other attributes of an entity; a current state of one or more orders arriving at or leaving from the complex; an indication of traffic within the complex; or other attributes of the complex.

At act 504, the facility determines a factor of congestion between the area in which the item arrived at the complex and the pre-selected storage locations. In some embodiments, as part of performing act 504, the facility performs at least a portion of a process to determine congestion within a complex, such as the process described below with respect to FIG. 6. In some embodiments, the facility performs the process described in FIG. 6 before performing act 504, and the facility uses heat maps generated via the process described in FIG. 6 to perform act 504.

Figure 6:
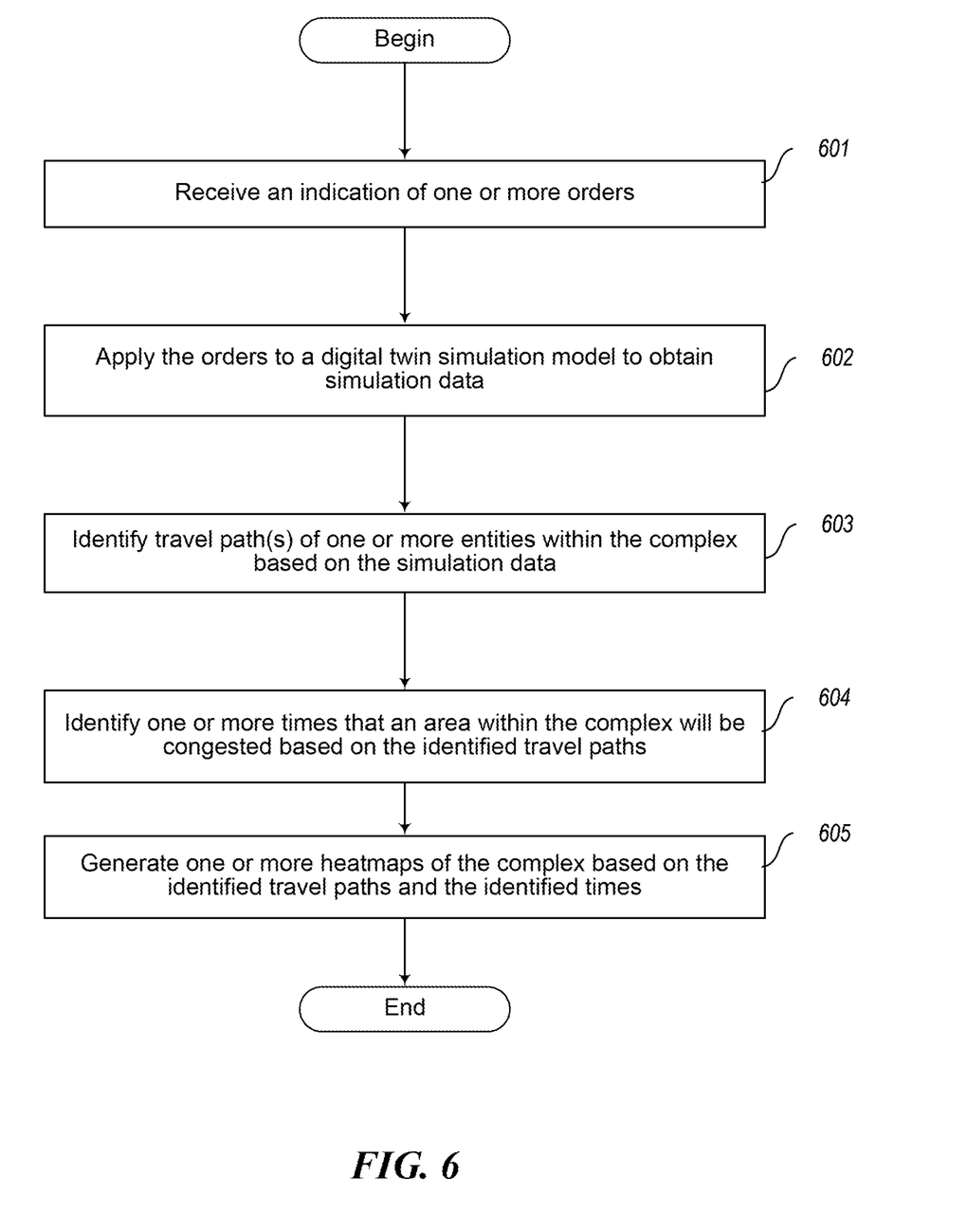
FIG. 6 is a flow diagram of a process to identify congestion within a complex used by the facility in some embodiments.

FIG. 6 is a flow diagram of a process to identify congestion within a complex used by the facility in some embodiments. First, at act 601, the facility receives an indication of one or more orders. In some embodiments, act 601 is performed in a similar manner to act 301.

At act 602, the facility applies the orders to a digital twin simulation model to obtain simulation data. In some embodiments, act 602 is performed in a similar manner to act 302.

At act 603, the facility identifies one or more travel paths of one or more entities within the complex based on the simulation data. The entities may be entities that move one or more items stored in the complex, that perform picking or put-away operations, or that perform tasks that are not related to moving, storing, or retrieving an item. In some embodiments, the simulation data includes a record of travel paths that entities are predicted to take when the one or more orders arrive or are shipped out of the complex.

At act 604, the facility identifies one or more times that an area within the complex will be congested based on the identified travel paths. In some embodiments, the facility determines, based on the travel paths, when entities are predicted to be within the area and determines that the area will be congested based on whether the number of entities within the area exceeds a threshold amount. In such embodiments, the threshold amount may change based on one or more of: the size of the area, the type of entities traveling through or in the area, whether the entities are performing operations or tasks within the area, or other factors related to determining a threshold amount of entities that will cause congestion within the area. In some embodiments, the facility determines a level of congestion of the area based on the number of entities that are predicted to be present in the area. For example, the facility may determine multiple threshold amounts of entities to cause congestion in the area, and for each threshold amount of entities determine whether the congestion in the area is low, medium, high, etc.

In some embodiments, the facility generates one or more predictions of congestion delays based on the level of congestion in the area. A "congestion delay" is a prediction of the amount of additional time an entity will need to travel through an area due to the current level of congestion in the area.

At act 605, the facility generates one or more heatmaps of the complex based on the identified travel paths and the identified times. The heatmaps of the complex indicate whether one or more areas of the complex are congested. In some embodiments, the heatmaps of the complex indicate a level of congestion within the area at one or more times. For example, a heatmap may include a red area that indicates that the area is heavily congested in the morning, but may also indicate that in the afternoon the area has low congestion by changing the heatmap to include a green area in the location of the previously indicated red area.

After act 605, the process to identify congestion within a complex ends.

Returning to FIG. 5, at act 505, the facility determines a cost of SKU for the item when the item for each pre-selected storage location. In some embodiments, the facility applies one or more attributes of the item and the pre-selected storage locations to a machine learning model trained to output a cost of SKU based on one or more attributes of an item and a pre-selected storage location, such as a machine learning model trained via the process described below with respect to FIG. 7.

Figure 7:
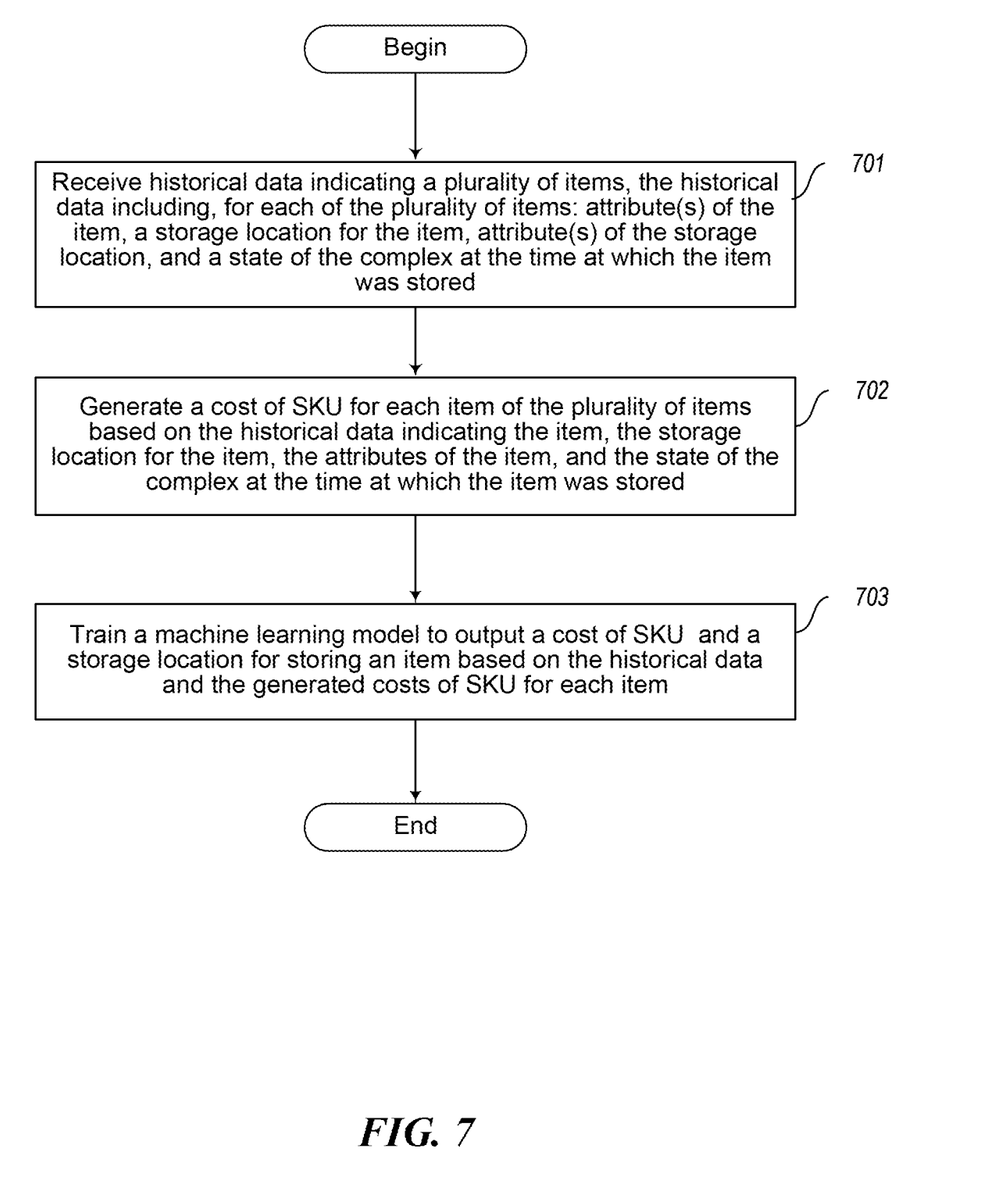
FIG. 7 is a flow diagram of a process to train a machine learning model to output a cost of SKU for storing an item at a location used by the facility in some embodiments.

FIG. 7 is a flow diagram of a process to train a machine learning model to output a cost of SKU for storing an item at a location used by the facility in some embodiments. First, at act 701, the facility receives historical data indicating a plurality of items, the historical data including, for each of the plurality of items: one or more attributes of the item, a storage location for the item, one or more attributes of the storage location, or a state of the complex at the time at which the item was stored. In some embodiments, the historical data includes one or more of a number of orders per hour that include the item or a lead time for the item. In some embodiments, the one or more attributes of the storage location includes one or more of: a number of picking operations at the storage location, such as an average number, a peak number, a number of picking operations that are predicted to be performed during a range of time within which the item arrives at the complex, etc.; an elevation of the location; a depth of the location; an amount of time for an entity to perform picking operations at the storage location; a type of the storage location; an indication of items already stored at the storage location; or other attributes of a storage location.

At act 702, the facility generates a cost of SKU for each respective item of the plurality of items based on the historical data indicating the respective item, the storage location for the respective item, the one or more attributes of the storage location, the one or more attributes for the respective item, and the state of the complex at the time at which the respective item was stored. In some embodiments, the facility generates the cost of SKU by determining the cost to store the item until it is shipped out, including the costs to move the item to different storage locations within the warehouse when needed. For example, the facility may take into account: the costs to move an item, including costs incurred by using an entity to move the item; the number of times that the item was moved, such as to another storage location, to be adjusted to store another item at the storage location, to be adjusted such that another item at the storage location can be picked, etc.; the costs for the item to occupy a storage location; the costs of maintaining the storage location, such as maintaining a controlled area (for example, a refrigerated area, humidity controlled area, etc.); or other factors that may be taken into account when generating the cost of SKU.

At act 703, the facility trains a machine learning model to output a cost of SKU and a storage location for storing an item based on the historical data and the generated cost of SKU for each item. In an example embodiment, inputs to the machine learning model include one or more of: one or more attributes of the item; a prediction of an amount of time that the item will be stored; one or more potential storage locations; a number of picks at the one or more potential storage locations; an elevation of the one or more potential storage locations; a measure of the time it takes for an entity to pick the item from the one or more storage locations; a time at which the item is predicted to be stored at the one or more storage locations; or an indication of whether multiple items of the same type can be carried by an entity at one time. In an example embodiment, the machine learning model outputs a storage location for the item and a predicted cost of SKU for storing the item at the storage area.

After act 703, the process to train a machine learning model to output a cost of SKU for storing an item at a location ends. In some embodiments, the facility collects additional historical data over a selected period of time and uses the additional historical data to re-train the machine learning model. For example, the facility may re-train the machine learning model every month in order to ensure that seasonality of items is taken into account when determining a cost of SKU and storage location. In some embodiments, the machine learning model is continuously re-trained, (for example, re-training the machine learning model every day, week, month, hour, or other time period). In such embodiments, the continuous re-training of the machine learning model allows the machine learning model to continuously learn new behavior of entities in the complex or of constraints for items, entities, etc.

Returning to FIG. 5, at act 506, the facility selects a location to store the item based on the cost of SKU and a factor of the congestion for each pre-selected storage location. In some embodiments, the facility selects the location with the lowest cost of SKU, with the lowest factor of congestion, or some combination thereof. In some embodiments, the facility selects the location to store the item based on the cost of SKU, factor of the congestion for each pre-selected storage location, and a state of the complex at the time the item arrives at the complex. In such embodiments, the facility may obtain the state of the complex from a digital twin simulation model of the complex.

In some embodiments, the facility selects the location to store the item based on the cost of SKU, the factor of the congestion for each pre-selected storage location, and one or more constraints of each pre-selected storage location. For example, a pre-selected storage location may require the use of a specific forklift that can reach the top of the storage location. In this example, if the facility determines that the specific forklift is not available based on the state of the complex, it is possible that the facility does not select the pre-selected storage location even if the pre-selected storage location has the lowest cost of SKU or the lowest factor of congestion.

After act 506, the process to select a location for storing an item when the item arrives at a complex ends. In some embodiments, the facility performs the process to select a location for storing an item when the item arrives at a complex in real-time when the item arrives at the complex.

In some embodiments, the facility performs process to select a location for storing an item when the item arrives at a complex when the item is picked up by an entity to be stored. Thus, in such embodiments, it is possible that the storage location for the item is not selected until an entity has picked up the item to move it to the storage location.

In some embodiments, after act 506, the facility causes an entity to store the item at the selected location, such as by transmitting an indication of the location to a computing device associated with the entity. In some embodiments, the indication of the location includes an indication of an orientation of the item when the item is stored at the storage location.

Figure 8:
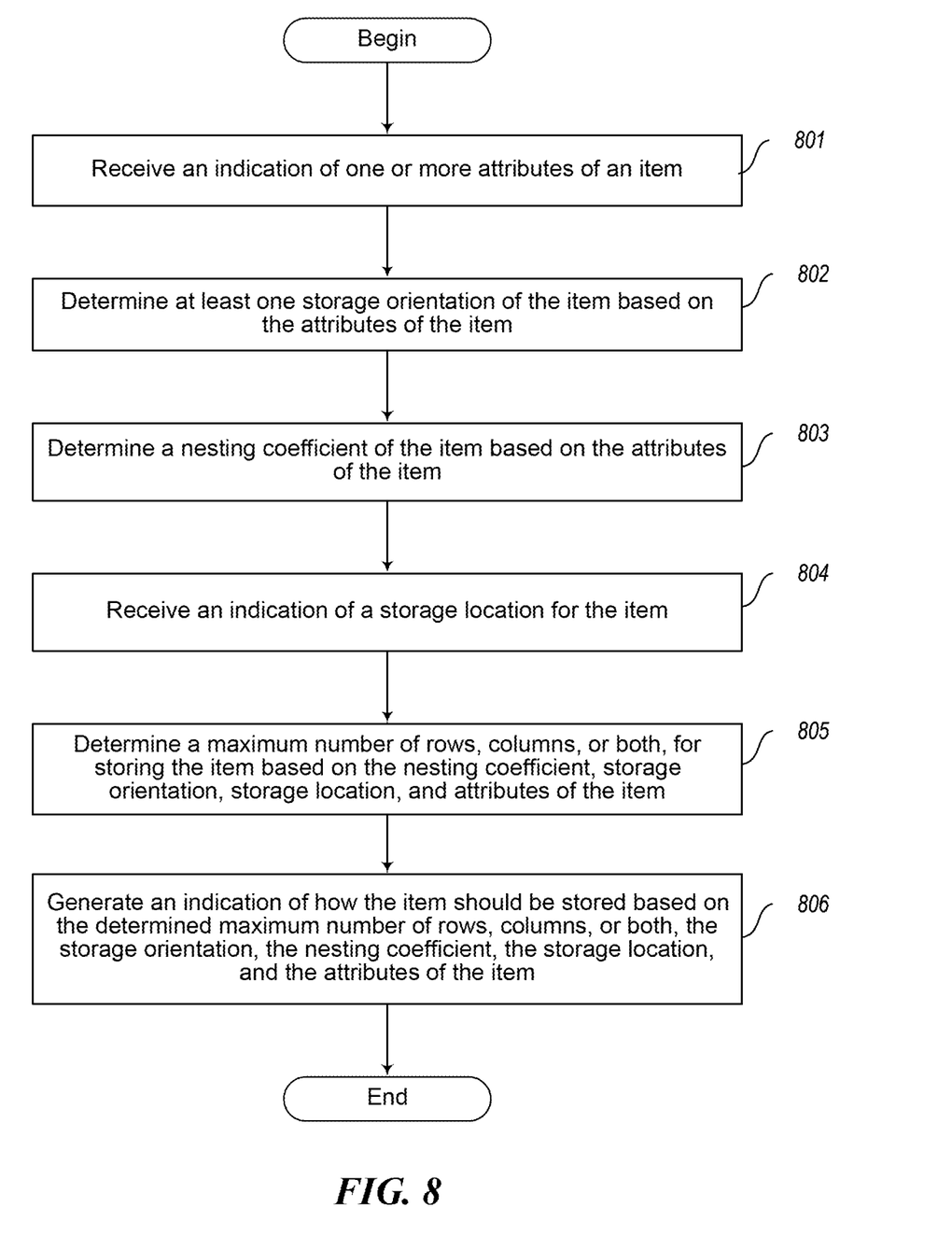
FIG. 8 is a flow diagram of a process to use a nesting coefficient to generate an indication of how an item should be stored in a storage location used by the facility in some embodiments.

FIG. 8 is a flow diagram of a process to use a nesting coefficient to generate an indication of how an item should be stored in a storage location used by the facility in some embodiments. First, at act 801, the facility receives an indication of one or more attributes of an item. In some embodiments, the item is an item that has arrived at a complex and for which a storage location of the item has been selected.

At act 802, the facility determines at least one storage orientation of the item based on the attributes of the item. For example, the facility may determine that a shape of the item may make the item more susceptible to rolling when it is oriented in a certain way and selects a storage orientation that reduces the chance that the item will roll. In another example, the facility may determine that one or more orientations of the item will damage the item based on the attributes of the item and may select a storage orientation that would not damage the item. In another example, the facility may determine that one or more orientations of the item will result in more items being able to be stored in the storage location than would be possible with other orientations.

At act 803, the facility determines a nesting coefficient of the item based on the one or more attributes of the item.

At act 804, the facility receives an indication of a storage location for the item.

At act 805, the facility determines a maximum number of rows, maximum number of columns, or both for storing the item in the storage location based on the nesting coefficient, storage orientation, storage location, and attributes of the item. For example, the facility may compare the dimensions of the storage location, the dimensions of the items already stored at the storage location, the dimensions of the item to determine the maximum number of rows, columns, or both, for storing the item in the storage location. In some embodiments, the facility applies the nesting coefficient to the dimensions of the item while comparing the dimensions of the item to the dimensions of the storage location and other items stored in the storage location.

At act 806, the facility generates an indication of how the item should be stored based on the determined maximum number of rows and/or columns, the storage orientation, the nesting coefficient, the storage location, and the attributes of the item. In some embodiments, the indication is three-dimensional model generated by the facility. In some embodiments, the indication is transmitted to a computing device associated with an entity that is storing the item.

After act 806, the process to use a nesting coefficient to generate an indication of how an item should be stored in a storage location ends.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. One or more instances of computer-readable media collectively having contents configured to cause a computing device to perform a method for determining a storage location for an item, the method comprising:
at a first time:
receiving an indication of one or more orders, each order indicating a time at which at least one item is scheduled to arrive at a complex;
obtaining simulation data by applying the indication of the one or more orders to a digital twin simulation of a complex, the simulation data indicating one or more predicted states of the complex after the arrival of each order of the one or more orders;
identifying one or more attributes of an item indicated in at least one order of the one or more orders; and
identifying one or more storage locations for the item based on the simulation data and the one or more attributes of the item; and
at a second time after the first time:
receiving an indication that the item has arrived at the complex;
in response to receiving the indication that the item has arrived at the complex, obtaining data regarding a current state of the complex based on the digital twin simulation of the complex; and
selecting a storage location for the item based on the identified one or more storage locations and the current state of the complex.

2. The one or more instances of computer-readable media of claim 1, wherein the method for determining a storage location for the item further comprises:
receiving an indication that an entity has picked the item;
obtaining an indication of a current state of the complex from the digital twin simulation model; and
selecting a storage location for the item based on the one or more storage locations and the current state of the complex.

3. The one or more instances of computer-readable media of claim 1, wherein selecting a storage location for the item further comprises:
determining a measure of the congestion at the one or more storage locations in the complex based on the current state of the complex.

4. The one or more instances of computer-readable media of claim 1, wherein selecting a storage location for the item further comprises:
determining a nesting factor of the item based on the one or more attributes of the item.

5. The one or more instances of computer-readable media of claim 1, wherein the method for determining a storage location for the item further comprises:
causing an entity to transport the item to the selected storage location.

6. The one or more instances of computer-readable media of claim 5, wherein causing an entity to transport the item further comprises:
identifying a computing device associated with the entity; and
causing the computing device to display an indication of how the item is to be stored at the at least one storage location.

7. The one or more instances of computer-readable media of claim 1, wherein identifying one or more storage locations for the item further comprises:
obtaining an indication of a plurality of resource costs for storing the item at each storage location from a plurality of locations by applying a machine learning model configured to output a resource cost for storing an item at a storage location to the one or more attributes of the item and the simulation data; and
selecting the one or more storage locations from the plurality of storage locations based on the indicated resource costs for storing the item at each storage location.

8. The one or more instances of computer-readable media of claim 7, wherein the method further comprises:
receiving an indication of historical prediction data, the historical prediction data including at least one resource cost calculated by the machine learning model, at least one storage location, and at least one item stored at the storage location, the at least one resource cost having been output by applying the machine learning model to the at least one storage location and one or more attributes of the at least one item stored at the storage location;
receiving an indication of actual data, the actual data including at least one resource cost indicating an actual cost of storing an item at a storage location; and
re-training the machine learning model based on the historical prediction data and the actual data.

9. One or more storage devices storing an item storage location data structure, the data structure comprising:
information specifying an order indicating a time at which at least one item is scheduled to arrive at a complex;
information indicating one or more attributes of items among the at least one item;
information indicating a forecasted state of the complex at the indicated time;
information indicating a current state of the complex during a time at which the at least one item arrives at the complex; and
information indicating one or more storage locations for the at least one item, such that, at a first time, the forecasted state of the complex and the one or more attributes for the item are usable to identify the indicated one or more storage locations for the item, and at a second time after the first time, the information indicating the current state of the complex and the identified one or more storage locations are usable to select a storage location for the at least one item in response to an indication that the item has arrived at the complex.

10. The one or more storage device of claim 9, the data structure further comprising:
information specifying a state of a machine learning model configured to output a resource cost based on one or more attributes of an item and a forecasted state of the complex, such that the one or more attributes for the item and the forecasted state of the complex are applied to the machine learning model to obtain one or more resource costs for a plurality of storage locations, such that the one or more resource costs are usable to identify the one or more storage locations from the plurality of storage locations.

11. The one or more storage device of claim 9, the data structure further comprising:
information specifying historical congestion data for the complex, the historical congestion data indicating a level of congestion near one or more storage locations at one or more past times,
such that the historical congestion data is usable to identify the one or more storage locations from the plurality of storage locations.

12. The one or more storage device of claim 9, the data structure further comprising:
information specifying a nesting factor for the item,
such that the nesting factor is determined based on the one or more attributes of the item.

13. The one or more storage device of claim 9, the data structure further comprising:
information specifying one or more entities; and
information specifying one or more resource costs for each of the one or more entities to transport an item,
such that the information specifying the one or more resource costs are usable to identify the one or more storage locations for the item.

14. A system for provisioning machine learning model resources, the system comprising:
a computing device configured to:
at a first time:
receive an indication of one or more orders, each order indicating a time at which at least one item is scheduled to arrive at complex;
obtain simulation data by applying the indication of the one or more orders to a digital twin simulation of a complex, the simulation data indicating a forecasted state of the complex;
identify one or more attributes of an item indicated in at least one order of the one or more orders; and
select one or more storage locations for the item based on the simulation data and the one or more attributes of the item; and
at a second time after the first time:
receive an indication that the item has arrived at the complex;
in response to receiving the indication that the item has arrived at the complex, obtain data regarding a current state of the complex based on the digital twin simulation of the complex; and
select a storage location for the item based on the identified one or more storage locations and the current state of the complex.

15. The system of claim 14, wherein, to select the storage location, the computing system is further configured to:
determine a measure of the congestion at the one or more storage locations in the complex based on the current state of the complex.

16. The system of claim 14, wherein, to select the storage location, the computing system is further configured to:
determine a nesting factor of the item based on the one or more attributes of the item.

17. The system of claim 14, wherein the computing system is further configured to:
cause an entity to transport the item to at least one storage location of the one or more storage locations.

18. The system of claim 14, wherein, to cause the entity to transport the item, the computing system is further configured to:
identify a computing device associated with the entity; and
cause the computing device to display an indication of how the item is to be stored at the at least one storage location.

19. The system of claim 14, wherein, to select the one or more storage locations, the computing system is further configured to:
obtain an indication of a plurality of resource costs for storing the item at each storage location from a plurality of locations by applying a machine learning model configured to output a resource cost for storing an item at a storage location to the one or more attributes of the item and the simulation data; and
select the one or more storage locations from the plurality of storage locations based on the indicated resource costs for storing the item at each storage location.

20. The system of claim 19, wherein the computing system is further configured to:
receive an indication of historical prediction data, the historical prediction data including at least one resource cost calculated by the machine learning model, at least one storage location, and at least one item stored at the storage location, the at least one resource cost having been output by applying the machine learning model to the at least one storage location and one or more attributes of the at least one item stored at the storage location;
receive an indication of actual data, the actual data including at least one resource cost indicating an actual cost of storing an item at a storage location; and
re-train the machine learning model based on the historical prediction data and the actual data.

* * * * *